United States Patent [19]

Najm

[11] Patent Number: 5,079,666
[45] Date of Patent: Jan. 7, 1992

[54] POWER SUPPLY SHUTDOWN THROUGH LOSS OF SYNC

[75] Inventor: Elie M. Najm, Cary, N.C.

[73] Assignee: International Business Machines Corporation, Armonk, N.Y.

[21] Appl. No.: 401,280

[22] Filed: Aug. 31, 1989

[51] Int. Cl.$^5$ .............................................. H02H 3/46
[52] U.S. Cl. ...................................... 361/85; 361/88; 358/190
[58] Field of Search ..................... 361/18, 78, 85–88, 361/111, 91; 358/188, 190, 243

[56] References Cited

U.S. PATENT DOCUMENTS 3,588,608  6/1971  Halinski et al. ...................... 361/88

Primary Examiner—Todd E. DeBoer
Attorney, Agent, or Firm—Joscelyn G. Cockburn

[57] ABSTRACT

A power supply for a video display device includes a protection circuitry which shutdown the power supply to prevent damage to the power supply or the display device. The protection circuitry monitors sync pulses generated in the video display device and disables the power supply switching transistor in the absence of the sync pulses. The protection circuitry is triggered in the event a fault occurs in the power supply or the video display device.

13 Claims, 1 Drawing Sheet

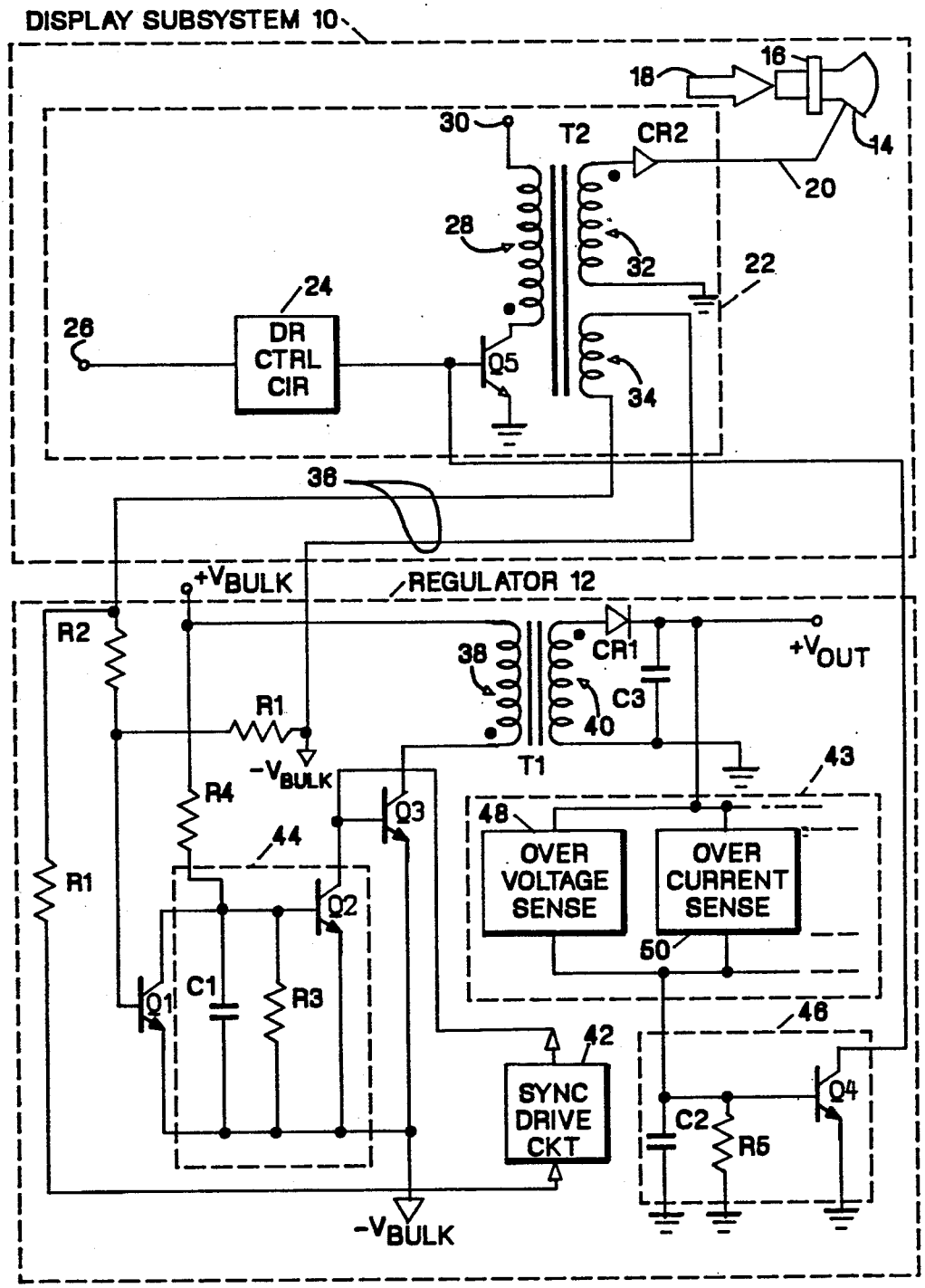

POWER SUPPLY SHUTDOWN THROUGH LOSS OF SYNC

BACKGROUND OF THE INVENTION

1. Field of the Invention

The invention relates to power supplies in general and more particularly to power supplies that are used to provide voltages for video devices or the like.

2. Prior Art

Video display devices, such as television receivers and computer monitors incorporate power supplies that produce one or more regulated voltage levels for powering various load circuits. The load circuits may be incorporated in the video display devices or may be peripheral or external devices. In a typical arrangement the power supply includes a power transformer which has a primary winding and a secondary winding. The primary winding is coupled through a switching transistor sub-system to an energy source and the secondary winding is coupled through regulating circuits to the display. The switching transistor sub-system includes one or more sense/control circuits which result in regulation of the output voltages.

Occasionally, error or fault conditions may occur in the power supply and/or the load circuits. If not protected, such error conditions could damage the power supply and/or load circuits. One way to protect against such damage is to provide protection circuitry that shuts down the power supply on the occurrence of a fault condition. Because the circuits that control the switching transistor are usually located on the primary side of the power transformer, the protection circuitry is usually located there. However, in order to protect circuits, devices, etc. on the secondary side, protection circuits are also required there. As a result the problem is how to send information from the fault detection circuits on the secondary side to the primary side without losing the cost advantages of primary sensing and without adding any new components which would necessarily have to meet the primary to secondary isolation requirements.

One conventional solution to this problem is to use a transformer or optical isolator to interconnect fault detection circuits on the secondary side of the power transformer with the protection circuitry on the primary side. An example of this solution is set forth in U.S. Pat. No. 4,709,321. Even though this solution works well for its intended purpose, it adds a relatively expensive component which is unacceptable for cost sensitive display products.

Another solution is to intentionally short circuit an output or secondary side voltage when a fault condition is detected. This causes an overcurrent condition in the primary side circuit. This overcurrent condition is sensed and is used to trigger the shutdown circuit. An example of this technique is set forth in U.S. Pat. No. 4,685,020. This approach is a step in the right direction in that it requires no pulse transformer or optical isolators. Instead, the fault information is passed through the power transformer in the form of an overcurrent. One possible disadvantage is that circuitry must be added to create the secondary short circuit. The circuitry usually includes a power silicon control rectifier (SCR). SCRs are usually expensive and further increase the cost of the power supply.

SUMMARY OF THE INVENTION

It is, therefore, a general object of the present invention to provide a more efficient scheme which shuts down a power supply when a fault condition is sensed in the power supply and/or the load which it drives.

The scheme is particularly suited for power supplies that are synchronized to operate at the frequency of the load which said power supply drives. For loads such as displays, sync pulses which are used to synchronize the operating frequency of the display with the switching frequencies of the power supply are generated at the display. The sync pulses are transmitted to the power supply. When a fault condition is detected, transmission of the sync pulses is inhibited. Lack of the sync pulses triggers a shutdown circuit which shutdown the power supply. Once triggered, the shutdown circuit keeps the power supply off until the input a.c. input voltage is interrupted. This technique results in protection with a minimum number of components which is consistent with low cost objectives for a monitor power supply.

More particularly, the novel power supply and shutdown circuit includes a power regulator that generates power for driving a display unit which is coupled to the secondary side of the said regulator. The display unit includes a voltage (HV) flyback regulator that generates high voltages for driving the display tube. The HV flyback regulator includes a drive control circuit which establishes the frequency and duty cycle for an HV switching transistor. The drive pulses (called sync pulses) are transmitted to the primary side of the power regulator and are used to synchronize the operating frequency of the display with the switching frequency of the power regulator.

A sense circuit means is connected in the secondary side of the power regulator for sensing fault conditions. A switching circuit interconnects the sense circuit means to the circuit arrangement that generates the sync pulses. When a fault condition is sensed, the switching circuit inhibits the transmission of the sync pulses. A sync detector circuit, located on the primary side of the power regulator, senses the absence of sync pulses and triggers the shutdown circuit which shutdown the power regulator.

The foregoing features and advantages of the invention will be more fully described in the accompanying drawing.

BRIEF DESCRIPTION OF THE DRAWINGS

The sole FIGURE is a block diagram and schematic diagram of a diplay system with a power subsystem according to the teachings of the present invention.

DESCRIPTION OF THE PREFERRED EMBODIMENT

The sole FIGURE shows a video apparatus, such as a television receiver or computer monitor. The video apparatus includes a display sub-system 10 for displaying information and a regulator 12 which generates power for driving the display sub-system. The display sub-system includes CRT 14 and deflection yoke 16 which is located on the neck of CRT 14. Information which is to be displayed on CRT 14 is supplied on bus 18. The source of the information may be a computer or any other suitable means. A horizontal deflection coil (not shown) is positioned within yoke 16. High voltage for the anode of the CRT is provided by the horizontal deflection system 22 and is connected to the tube by conductor 20. As will be described in greater detail, subsequently, the operating frequency of the power supply is synchronized to the sweep frequency of the CRT. The synchronization of the power supply and the sweep frequency of the CRT is desirable because front of screen interference is minimized when both frequencies are synchronized.

The horizontal deflection system 22 may take different forms of implementation. However, its main function is to provide a source of high voltage signals for driving CRT 14. In the preferred embodiment of this invention the horizontal deflection system 22 includes a flyback transformer T2, switching transistor Q5 and drive control circuit 24. The drive control circuit 24 receives clock signals from terminal 26 and provides base drive for switching transistor Q5. The collector electrode of switching transistor Q5 is connected to one end of primary coil 28. The other end of primary coil 28 is connected to a source of regulated secondary d.c. voltage identified by numeral 30. This voltage is generated by an output (not shown) of regulator 12. Coils 32 and 34 are provided on flyback transformer T2. Current flow from the regulated d.c. voltage source, at terminal 30, through primary winding 28 causes current to flow in coils 32 and 34. The current flow causes voltages to be developed on said coils. The voltage which is developed across coil 32 is rectified by diode CR2 and is provided over conductor 20 to the CRT 14. As will be described subsequently, the voltage which is developed across coil 34 is delivered by conductor 36 to sync detect circuit by devices Q1 and R2. The sync detector circuit is located on the primary side of power transformer T1.

Still referring to the sole figure, regulator 12 includes a power circuit formed by transformer T1, transistor Q3 and sync drive circuit 42. The sync drive circuit monitors sync pulse generated by coil 34 and drives Q3 at this same frequency, thus achieving synchronization to the horizontal frequency. Regulator shutoff circuit 44 is also coupled to Q3 and turns off Q3 when the sync pulse is not present. With Q3 off, the power supply is shutdown. The power transformer T1 includes a secondary winding 40 which is coupled through fault detection means 43 to horizontal deflection system shutoff circuit 46. As will be explained subsequently, if fault detection means 43 senses a fault condition it activates horizontal deflection shutoff circuit 46 which shuts off Q5. The schematic shows a direct connection to the base of transistor Q5. This is one implementation. The same result could be obtained by interfacing Q4 with the control circuit 24.

Still referring to the sole figure, the primary winding 38 of power transformer T1 is connected to an unregulated d.c. voltage supply marked as +Vbulk. The pulses which are used by sync drive circuit 42 to synchronize the switching frequency of regulator 12 with the sweep frequency of the display sub-system are generated by horizontal deflection system 22. As stated previously, this deflection system provides high voltage signals for driving CRT 14. The high voltage transformer T2 is located on the secondary side of transformer T1. It is necessary to transfer the sync pulses to the primary side of transformer T1 where regulator shutdown circuit 44 is located. A preferred way, according to the teaching of the present invention, is to wind a single turn of the wire shown in the figure as element 34 around the core (not shown) of the high voltage transformer T2. Of course, other means such as a transformer or optical isolator may be used for transferring synchronizing pulses from the horizontal deflection system of the display system to to the primary side of regulator 12.

Still referring to the sole figure, Q1 and R2 form a circuit arrangement which serves as the sync detector. Q1 is on whenever a positive sync pulse is present on conductor 36. R2 sets the drive current for Q1 and R0 serves as a leakage resistor. Capacitor C1 charges from the bulk voltage through R4. C1 is discharged by Q1 during each sync pulse. If no sync pulse occurs, C1 charges until it reaches the threshold of Q2. Q2 then turns on and shuts off Q3. With Q3 off, the power supply stops and sync pulses can no longer be generated. Therefore, the power supply will remain off until the bulk voltage is removed and C1 is discharged into R3.

The sync pulses are interrupted if a fault condition occurs on a power supply output. The fault detection means 43 includes overvoltage sense circuit 48 and overcurrent sense circuit 50. As the names imply, overvoltage sense circuit 48 senses an overvoltage fault in the output of regulator 12 and the overcurrent sense circuit 50 senses an overcurrent fault condition on the output of regulator 12. As indicated by the broken lines, other types of fault sensing circuits can be added to the output of regulator 12 without deviating from the scope or spirit of the present invention. Because the details of overvoltage sense circuits and overcurrent sense circuits are well within the skill of one skilled in the art, details of these circuits will not be given here. Suffice it to say that examples of such circuits may be found in U.S. Pat. No. 4,685,020 and is incorporated herein by reference.

The output of the overvoltage sense circuit, overcurrent sense circuit and other fault detection circuits (not shown) are connected together such that if any fault occurs Q4 is made to conduct. R5 is a leakage resistor for Q4 and C2 provides noise immunity. The collector of Q4 is connected to the base of Q5. As previously indicated, Q5 represents the horizontal output device or switching transistor for horizontal deflection circuitry and the display sub-system. As indicated previously, Q5 drives the high voltage transformer T2 which produces the high voltage pulses. With Q4 on, Q5 will turn off and the sync pulses are stopped. This, in turn, is detected by sync detector Q1 and R2 and as described previously shuts down the power supply. Thus, the fault information is passed from the secondary side of the power supply to the primary via the high voltage transformer T2. It should be noted that at startup no sync pulses are available because the output voltages are not yet present. R4 and C1 are selected such that the charging time of C1 is longer than the rise time of the power supply. This allows the supply to start without shutting down.

The present invention offers several advantages including low cost in that existing primary to secondary isolation is used and low voltage, low power components are also used. The invention is versatile in that the concept of shutdown in response to loss of sync signals is not limited to a particular circuit implementation. It can be adapted for use with any power supply topology.

While the invention has been particularly shown and described with reference to the preferred embodiment thereof, it will be understood that various changes in form and details may be made therein without departing from the spirit and scope of the invention.

I claim:

1. An improved power supply for use with a video device comprising:
    a power circuit means which generates power for driving the video device, said power circuit means including a power transformer having a primary winding and a secondary winding;
    a fault detection circuit means for sensing fault conditions coupled to the secondary winding;
    a first circuit means coupled to the secondary winding of the power circuit means; said first circuit means generating high voltage signals for driving the video device;
    a first shutdown circuit means connected to the secondary winding and interconnecting the first circuit means and the fault detection circuit means; said shutdown circuit means responsive to signals outputted from the fault detection circuit means to inhibit the first circuit means from generating said high voltage signals; and
    a second shutdown circuit means connected to the primary winding of the power circuit means; said second shutdown circuit means monitoring the high voltage signals and shutting down said power supply if the high voltage signals are not sensed.

2. The improved power supply of claim 1 wherein the fault detection circuit means includes an overvoltage sense circuit means connected in parallel with an overcurrent sense circuit means.

3. The improved power supply of claim 1 wherein the first shutdown circuit means includes a switching transistor and a filter circuit connected to a base electrode of said switching transistor.

4. The improved power supply of claim 1 wherein the second shutdown circuit means includes:
    a voltage supply source;
    a storage means coupled to said voltage supply source;
    a first switching means coupled to the storage means, said first switching means discharging said storage means when the charge thereon reaches a predetermined level; and
    a second switching means coupled to the storage means, said second switching means discharging said storage means when the high voltage signals are sensed.

5. The improved power supply of claim 1 wherein the first circuit means includes a horizontal deflection circuit arrangement which generates high voltage signals for driving a CRT of said video device.

6. In a display system having a power supply sub-system said power supply sub-system including a transformer with primary winding and secondary windings, a display sub-system coupled to one of the secondary windings, a switching transistor coupled to the primary winding and a control circuit for controlling the ON time of said switching transistor, an improved protection circuit for shutting down said power supply comprising:
    a circuit means for generating electrical signals that are used to synchronize the display device sweep frequency with the switching transistor switching frequency;
    error detection means coupled to the secondary winding, said error detection means for detecting electrical faults;
    a first shutdown circuit means connected to the error detection means; said first shutdown circuit means responsive to signals outputted from the error detection means to inhibit the circuit means from generating the electrical signals;
    a second circuit means coupled to the primary winding; said second circuit means for turning off the power supply if activated; and
    a third circuit means connected to the primary winding for monitoring the electrical signals and activating the second circuit means when the electrical signals are not sensed.

7. In a display system having a power supply sub-system including a transformer with primary winding and secondary winding, a display device coupled to the secondary winding, a switching transistor coupled to the primary winding and a control circuit for controlling the ON time of said switching transistor, an improved protection circuit for shutting down said power supply comprising:
    a circuit means for generating sync pulses for synchronizing the display operating frequency with the switching transistor switching frequency;
    a sync drive circuit means connected to the circuit means, said sync drive circuit means responsive to the sync pulses to generate pulses which synchronize the display operating frequency with the switching transistor switching frequency;
    a second circuit means for shutting down the power supply connected to the switching transistor; and
    a third circuit means connected to the second circuit means for monitoring the sync pulses and activating the second circuit means if the sync pulses are not sensed.

8. The display system of claim 7 further including:
    an error detection circuit means coupled to the secondary windings, said error detection circuit means detecting fault condition in said secondary windings; and
    a fourth circuit means responsive to signals outputted from the error detection circuit means to deactivate the circuit means when the detection circuit means sense a fault condition.

9. In a display system having a power supply sub-system said power supply including a transformer with primary winding and secondary winding, a display device coupled to the secondary winding, a switching transistor, a method for shutting down the power supply comprising the steps of:
    (a) generating sync pulses for synchronizing the display operating frequency with the switching transistor switching frequency;
    (b) providing a circuit for shutting down the power supply; and
    (c) monitoring the sync pulses and triggering the circuit if the sync pulses are not sensed.

10. A display system comprising:
    a display subsystem having a CRT to display images;
    a first circuit means generating high voltage signals to drive said CRT;
    a power supply providing power to said display subsystem said power supply including a power circuit having a first transformer with primary windings and secondary windings, with the secondary windings coupled to the first circuit means;
    a circuit arrangement interconnecting the primary windings of the power supply and the first circuit means said circuit arrangement providing sync pulses used to synchronize operating frequencies of the CRT with switching frequencies of the power supply;

a switching means connected to the primary winding; said switching means responsive to a control signal to control current flow through said primary winding;

a control circuit responsive to the sync pulses to generate the control signal;

a first shutdown circuit for deactivating the switching means; and a monitoring circuit means coupled to the circuit arrangement; said monitoring circuit means monitoring the sync pulses and triggering the shutdown circuit to deactivate said switching means if the sync pulses are not sensed.

11. The display system of claim 10 further including a second shutdown circuit coupled to the first circuit means, said shutdown circuit responsive to enabling signals to inhibit the first circuit means from generating the high voltage signals; and error detection circuit means detecting fault conditions coupled to the secondary windings, said error detection circuit means generating the enabling signals when fault conditions are sensed.

12. The display subsystem of claim 10, wherein the first circuit means includes a second transformer having a core with a primary winding and a first secondary winding coupled to the display subsystem;

a switching transistor connected to the primary winding; and a driver control circuit means connected to the switching transistor.

13. The display subsystem of claim 12 wherein the circuit arrangement includes a second secondary winding disposed on the core of the second transformer.

* * * * *